April 19, 1927.　　　　R. L. GILLES　　　　1,625,310

EVAPORATION METER

Filed Aug. 30, 1926

INVENTOR
R. L. GILLES
BY
ATTORNEYS

Patented Apr. 19, 1927.

1,625,310

UNITED STATES PATENT OFFICE.

RICHARD L. GILLES, OF FARGO, NORTH DAKOTA.

EVAPORATION METER.

Application filed August 30, 1926. Serial No. 132,559.

My invention relates to improvements in evaporation meters, especially those designed for use in the incubation of eggs, and it consists in the combinations, constructions, and arrangements herein described and claimed.

An object of my invention is to provide an improvement over one set forth in my prior application, Serial No. 96,255 filed March 20, 1926. In said application I disclosed an evaporation meter having a glass tube on which was inscribed a scale, by means of which the evaporation from the tube might be measured.

I have found that it is often difficult to read the graduations where the scale is on the tube itself, due to the deposits from the liquid inside of the glass, and, furthermore, from the fact that the water line is not a straight line, but is curved, due to the surface tension of the liquid. Furthermore, in devices where the scale is on the tube, when the latter breaks it must be replaced by a new tube with a scale marked thereon.

In the present invention I make use of an ordinary test tube which can be purchased at a much less cost than the tube which has to be specially graduated. The tube is in a holder upon which the scale is inscribed or impressed, so that when the tube is broken all that is necessary is to replace it with an ordinary plain test tube.

A further object is to provide a device which is more easily read than a tube with the scale marked thereon in that the reading does not have to take place through the glass or against a semi-opaque background, but the scale being in full sight at all times, it is immaterial as to the clearness of the liquid as far as accuracy in reading is concerned. In fact, the reading is actually made easier by rendering the liquid semi-opaque, such as by coloring it.

A further object is to provide an evaporation meter having a plain tube in which the holder itself may be readily removed, while securely grasping the tube, so that the latter may be turned to an angle which is best for reading the scale.

Other objects and advantages will appear in the following specification, and the novel features of the invention will be particularly pointed out in the appended claims.

Figure 1:
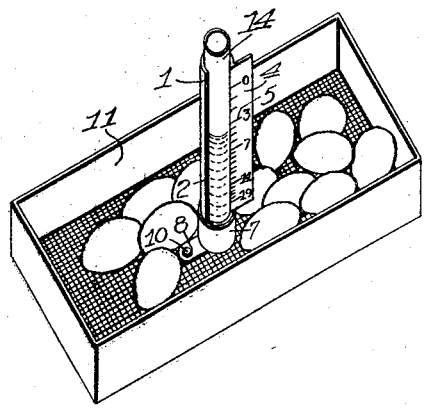
Figure 2:
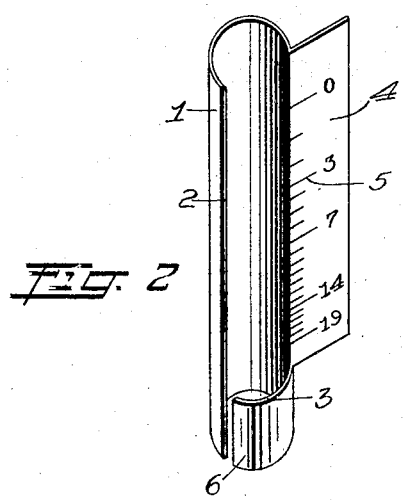
Figure 4:
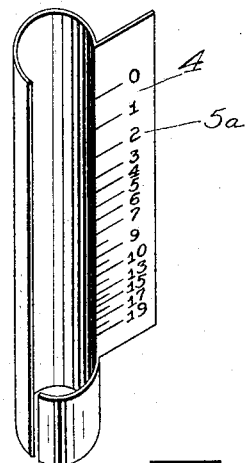
Figure 3:
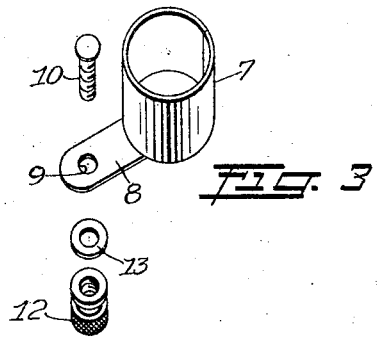

My invention is illustrated in the accompanying drawings, forming part of this application, in which Figure 1 is a perspective view of a tray of eggs having the evaporation meter applied thereto, Figure 2 is a perspective view of the tube holder, Figure 3 is a perspective view of the socket for receiving the tube holder, and Figure 4 is a modified form of scale.

In carrying out my invention I provide a metal shell 1, which is curved in substantially cylindrical shape. This metal shell is split longitudinally along the line 2 and is also cut at 3. That portion of the shell above the line 3 is bent backwardly into the form of a flat plate 4 upon which a scale 5 is marked. In the present instance I prefer to mark this scale with the numerals 0, 3, 7, 14 and 19, as shown, these marks indicating the days that it is customary in artificial incubation to test the eggs for fertility on the third or seventh days and to test them again for dead germs on the 14th day, the last mark 19 indicating the end of the incubation period. The scale, it will be observed, is graduated with marks which indicate the normal evaporation for each day. As the liquid evaporates from the tube, there will be less evaporation per day, and, consequently, the marks are closer together at the bottom.

That part below the line 3 forms a spring member 6 for holding the tube. Sometimes the tubes that were approximately the same size really vary in diameter a little bit and this spring member provides for such variation so as to hold a tube of approximately given size firmly in position.

The socket for retaining the tube holder is shown in Figure 3. It consists of a cylindrical thimble 7, having an integral flange 8 extending laterally therefrom at the bottom. This flange has an opening 9 through which a screw 10 may be passed. This screw extends through the bottom of a tray 11 and is secured by means of a thumb nut 12 and washer 13.

In Figure 1 I have illustrated a tray in which the eggs are to be turned by hand, but with mechanical egg turners the tube holder, instead of being located in the midst of the eggs, might be located at one side where it would not interfere with the turning of the eggs.

From the foregoing description of the various parts of the device, the operation thereof may be readily understood. An evaporation tube 14, which, as stated, in this instance is merely an ordinary test tube, is placed in the holder, the lower end being firmly gripped by the spring portion 6. The latter is then placed in the thimble 7 so that the tube is held in an upright position.

The evaporation tube measures the evaporation of water resulting from the temperature, humidity, movement of air, and the altitude, so that a change in any one of these factors will be immediately shown in the resulting evaporation of the water in the tube. The scale represents the normal evaporation for best results.

In the incubation of eggs, the exclusion of a chick at the proper time depends upon the correct size of the air cell. This air cell is in the enlarged end of the egg and is formed by the evaporation of the water contents of the egg. It is, of course, highly desirable to maintain the correct rate of evaporation. Now, by watching the rate as indicated by the scale, and controlling the temperature, the movement of air, ventilation, etc., one can keep the evaporation near normal, and, therefore, have a good yield, which might otherwise be poor, due to too rapid or too slow evaporation.

One advantage of the present form of the device is that the tube may be shifted with respect to the scale to compensate for any abnormal conditions that may arise. This cannot be done, of course, with a tube having a scale directly marked thereon. Furthermore, the holder serves as a protection to the tube, so that there is less liability of breaking a tube with this holder than where the tube is merely held at its bottom. The holder, in fact, consists of three parts—a shield or guard portion, a scale attached thereto, and a lower clamping portion, which, as stated, will firmly hold the tube in its relative position to the scale when the holder is removed from the socket, so that the holder may be turned to read the scale at the most desirable angle.

In Figure 4 I have shown a modified form of the device in which the plate 4 bears a scale 5ª, which is provided with more designated graduations than that shown in Figure 2. In Figure 4 there is a graduation to represent each day for the first week, after which the graduations represent every other day. This might allow for a quicker reading without having to compute between the lines for each day, but does not require graduation for each day toward the end of the incubation period where the lines for each day are, of course, closer together and harder to read and compute.

I claim:

1. An evaporation meter, comprising a plain glass tube, a semi-cylindrical shield for receiving said tube, a spring member carried by the shield at the bottom thereof for clamping the tube, and an integral flat plate carried by said shield and projecting laterally from one edge thereof, said plate having marked thereon a scale in juxtaposition with said tube.

2. An evaporation meter, comprising a plain glass tube, a semi-cylindrical shield for receiving said tube, a spring member carried by the shield at the bottom thereof for clamping the tube, an integral flat plate carried by said shield and projecting laterally from one edge thereof, said plate having marked thereon a scale in juxtaposition with said tube, and means for holding said shield in an upright position.

3. An evaporation meter, comprising a plain glass tube, a semi-cylindrical shield for receiving said tube, a spring member carried by the shield at the bottom thereof for clamping the tube, an integral flat plate carried by said shield and projecting laterally from one edge thereof, said plate having marked thereon a scale in juxtaposition with said tube, means for holding said shield in an upright position, and a cylindrical socket for receiving the said shield and said clamping member for holding the tube in an upright position.

4. An evaporation meter, comprising a plain glass tube, a semi-cylindrical shield for receiving said tube, a spring member carried by the shield at the bottom thereof for clamping the tube, an integral flat plate carried by said shield and projecting laterally from one edge thereof, said plate having marked thereon a scale in juxtaposition with said tube, means for holding said shield in an upright position, a cylindrical socket for receiving the said shield and said clamping member for holding the tube in an upright position, and means for securing said socket to a support.

RICHARD L. GILLES.